United States Patent
Yang

(10) Patent No.: US 12,549,959 B2
(45) Date of Patent: Feb. 10, 2026

(54) NETWORK SHARING METHOD AND APPARATUS FOR SUPPORTING MULTIPLE OPERATORS IN WIRELESS COMMUNICATION SYSTEM

(71) Applicant: Samsung Electronics Co., Ltd., Suwon-si (KR)

(72) Inventor: Sunggi Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 18/191,593

(22) Filed: Mar. 28, 2023

(65) Prior Publication Data
US 2023/0239706 A1 Jul. 27, 2023

Related U.S. Application Data

(63) Continuation of application No. PCT/KR2021/014357, filed on Oct. 15, 2021.

(30) Foreign Application Priority Data

Oct. 15, 2020 (KR) ........................ 10-2020-0133768

(51) Int. Cl.
*H04W 88/08* (2009.01)
*H04W 16/14* (2009.01)
*H04W 72/0453* (2023.01)

(52) U.S. Cl.
CPC ....... *H04W 16/14* (2013.01); *H04W 72/0453* (2013.01); *H04W 88/08* (2013.01)

(58) Field of Classification Search
CPC .............................. H04W 12/28; H04L 12/50
(Continued)

(56) References Cited

U.S. PATENT DOCUMENTS

| 6,925,294 B2 | 8/2005 | Ohtaki |
| 7,308,240 B2 | 12/2007 | Kishi |

(Continued)

FOREIGN PATENT DOCUMENTS

| CN | 1350370 A | 5/2002 |
| CN | 101335730 B | 5/2011 |

(Continued)

OTHER PUBLICATIONS

International Search Report dated Jan. 10, 2022, issued in International Application No. PCT/KR2021/014357.
(Continued)

*Primary Examiner* — Dang T Ton
(74) *Attorney, Agent, or Firm* — Jefferson IP Law, LLP

(57) ABSTRACT

The disclosure relates to a communication technique for convergence of internet of things (IoT) technology and a 5th generation (5G) or a pre-5G communication system for supporting a higher data transmission rate beyond a 4th generation (4G) communication system, such as the long term evolution (LTE) and a system therefor. The disclosure is applied to intelligent services (for example, smart homes, smart buildings, smart cities, smart cars or connected cars, healthcare, digital education, retail businesses, security- and safety-related services, and the like) based on 5G communication technology and IoT-related technology. A network sharing method and an apparatus for supporting multiple operators in a wireless communication system are provided.

16 Claims, 11 Drawing Sheets

(58) Field of Classification Search
USPC .................................. 370/329, 401, 402, 403
See application file for complete search history.

(56) References Cited

U.S. PATENT DOCUMENTS

| | | |
|---|---|---|
| 7,940,830 B2 | 5/2011 | Marsili et al. |
| 8,044,723 B2 | 10/2011 | Kim et al. |
| 9,077,393 B2 | 7/2015 | Monroe |
| 9,232,562 B2 | 1/2016 | Liu et al. |
| 9,974,083 B2 | 5/2018 | Serravalle et al. |
| 10,575,279 B2 | 2/2020 | Asuri et al. |
| 10,720,985 B1 | 7/2020 | Kanar et al. |
| 11,240,746 B1 * | 2/2022 | Wong .................... H04W 48/20 |
| 2004/0259518 A1 | 12/2004 | Aktas et al. |
| 2009/0290659 A1 | 11/2009 | Petrovic et al. |
| 2010/0227623 A1 | 9/2010 | De Pasquale et al. |
| 2010/0271985 A1 | 10/2010 | Gabriel et al. |
| 2012/0052822 A1 | 3/2012 | Monroe |
| 2014/0210666 A1 | 7/2014 | Maltsev et al. |
| 2014/0328431 A1 | 11/2014 | Haddad et al. |
| 2015/0358829 A1 | 12/2015 | Arnott et al. |
| 2018/0317222 A1 | 11/2018 | Oh |
| 2020/0058996 A1 | 2/2020 | Reddy |
| 2020/0162781 A1 | 5/2020 | Reddy et al. |

FOREIGN PATENT DOCUMENTS

| | | | |
|---|---|---|---|
| CN | 105308868 | A | 2/2016 |
| EP | 2 925 040 | A1 | 9/2015 |
| EP | 3 462 620 | A1 | 4/2019 |
| EP | 3 560 111 | A2 | 10/2019 |
| JP | 2003-018057 | A | 1/2003 |
| JP | 2013-258658 | A | 12/2013 |
| KR | 10-2013-0103732 | A | 9/2013 |
| KR | 10-2014-0024926 | A | 3/2014 |
| KR | 10-2014-0130625 | A | 11/2014 |
| KR | 10-2015-0104658 | A | 9/2015 |
| KR | 10-2016-0021200 | A | 2/2016 |
| KR | 10-1803342 | B1 | 11/2017 |

OTHER PUBLICATIONS

Korean Office Action dated Jan. 14, 2025, issued in Korean Application No. 10-2020-0133768.
European Search Report dated Jan. 16, 2024, issued in European Application No. 21880594.3.
Indian Examination Report dated Mar. 15, 2024, issued in Indian Application No. 202317025147.
Chinese Office Action dated Aug. 13, 2025, issued in Chinese Patent Application No. 202180070526.5.

* cited by examiner

NETWORK SHARING METHOD AND APPARATUS FOR SUPPORTING MULTIPLE OPERATORS IN WIRELESS COMMUNICATION SYSTEM

CROSS-REFERENCE TO RELATED APPLICATION(S)

This application is a continuation application, claiming priority under § 365(c), of an International application No. PCT/KR2021/014357, filed on Oct. 15, 2021, which is based on and claims the benefit of a Korean patent application number 10-2020-0133768, filed on Oct. 15, 2020, in the Korean Intellectual Property Office, the disclosure of which is incorporated by reference herein in its entirety.

BACKGROUND

1. Field

The disclosure relates to a wireless communication system. More particularly, the disclosure relates to a network sharing method and apparatus for supporting multiple operators.

2. Description of Related Art

An Effort is being made to develop an improved 5th generation (5G) communication system or a pre-5G communication system in order to meet the increasing demand for wireless data traffic after the commercialization of a 4th generation (4G) communication system. For this reason, the 5G communication system or the pre-5G communication system is called a communication system after the 4G network (Beyond 4G Network) or system after the long term evolution (LTE) system (Post LTE).

In order to achieve a high data rate, the 5G communication system is being considered for implementation in a super high frequency (millimeter wave (mmWave)) band (e.g., such as a 60 gigahertz (60 GHz) band). In order to alleviate the path loss of radio waves in the super high frequency band and increase the transmission distance of radio waves, in the 5G communication system, beamforming, massive multiple input multiple output (MIMO), full dimensional MIMO (FD-MIMO), array antenna, analog beam-forming, and large scale antenna technologies are being discussed.

In addition, in order to improve the network of the system, in the 5G communication system, technologies, such as evolved small cell, advanced small cell, cloud radio access network (cloud RAN), ultra-dense network, device to device communication (D2D), wireless backhaul, moving network, cooperative communication, coordinated multi-points (CoMP), interference cancellation, and the like are being developed.

In addition, in 5G system, an advanced coding modulation (ACM) method, such as hybrid frequency shift keying and quadrature amplitude modulation (FQAM) and sliding window superposition coding (SWSC), and an advanced connection technology, such as filter bank multi carrier (FBMC), non-orthogonal multiple access (NOMA), and sparse code multiple access (SCMA), and the like are being developed.

In the 5G system, support for various services is being considered compared to the existing 4G system. For example, the most representative services may be enhanced mobile broad band (eMBB), ultra-reliable and low latency communication (URLLC), massive machine type communication (mMTC), evolved multimedia broadcast/multicast service (eMBMS), and the like. In addition, the system providing the URLLC service may be referred to as a URLLC system, and the system providing the eMBB service may be referred to as an eMBB system. In addition, the terms service and system may be used interchangeably.

Among them, the URLLC service is a service that is newly considered by 5G system unlike existing 4G system, and requires ultra-high reliability (e.g., packet error rate of about 10-5) and low latency (e.g., about 0.5 msec) conditions to be satisfied compared to other services. In order to satisfy these strict requirements, the URLLC service may need to apply a shorter transmission time interval (TTI) than the eMBB service, and various operation methods using this are being considered.

Meanwhile, the Internet is evolving from a human-centered network in which humans generate and consume information to an internet of things (IoT) network that exchanges and processes information between distributed components, such as an object, and the like. Internet of everything (IoE) technology, which combines big-data processing technology, and the like through connection with a cloud server, and the like with internet of things (IoT) technology, is also emerging. In order to implement IoT, technology elements, such as sensing technology, wired and wireless communication and network infrastructure, service interface technology, and security technology are required, and recently, a technology, such as sensor network, machine to machine (M2M), and machine type communication (MTC), and the like for connection between objects has been studied.

In an IoT environment, an intelligent internet technology (IT) service that create a new value in human life by collecting and analyzing data generated from connected objects may be provided. IoT may be applied to field, such as a smart home, a smart building, a smart city, a smart car or connected car, smart grid, health care, smart home appliance, and advanced medical service, and the like through convergence and combination between an existing information technology (IT) technology and a various industry.

Accordingly, various attempts are being made to apply the 5G communication system to the IoT network. For example, technologies, such as sensor network, machine to machine (M2M), machine type communication (MTC), and the like are being implemented by techniques, such as beamforming, MIMO, array antenna, and the like, which are 5G communication technologies. The application of cloud radio access network (cloud RAN) as a big data processing technology described above may be an example of the convergence of 5G technology and IoT technology.

In addition, a technology for sharing a wireless network infrastructure (RAN sharing) by multiple communication service operators is being researched.

The above information is presented as background information only to assist with an understanding of the disclosure. No determination has been made, and no assertion is made, as to whether any of the above might be applicable as prior art with regard to the disclosure.

SUMMARY

A base station may configure a radio frequency chain (RF chain) based on a bandwidth allocated to multiple communication service operators in order to share a wireless network infrastructure (RAN sharing) with multiple communication service operators.

Therefore, as the number of communication service operators to support increases, the size of the frequency bandwidth of the frequency band that RF chain should operate in order to share the wireless network infrastructure may increase.

However, as the size of the frequency bandwidth of the frequency band that needs to operate increases, the problem that it is difficult to implement components of the base station equipment, the component costs rapidly increases, and power consumption also increases rapidly may occur.

This disclosure was devised to address the above issue and aims to consider the size of the frequency bandwidth of the frequency band that needs to operate in some configurations of RF chain as the size of the frequency bandwidth corresponding to the frequency band operated by one communication service operator, not the sum of the size of the frequency bandwidths corresponding to the frequency bands operated by multiple communication service operators.

Aspects of the disclosure are to address at least the above-mentioned problems and/or disadvantages and to provide at least the advantages described below. Accordingly, an aspect of the disclosure is to provide a network sharing method and apparatus for supporting multiple operators.

Additional aspects will be set forth in part in the description which follows and, in part, will be apparent from the description, or may be learned by practice of the presented embodiments.

In accordance with an aspect of the disclosure, a base station in a wireless communication system is provided. The base station includes a baseband (BB) processor configured to generate and output a signal of a first frequency band corresponding to a first frequency bandwidth, an intermediate frequency (IF) band processor configured to convert and output the signal of the first frequency band output from the baseband (BB) processor into a signal of a second frequency band corresponding to a second frequency bandwidth, a switch matrix controller configured to generate a switch matrix control signal for mapping one of at least one phase locked loop (PLL) to an antenna array, and a radio frequency (RF) band processor configured to convert the signal of the second frequency band into a signal of a third frequency band corresponding to a third frequency bandwidth using the at least one PLL and a switch matrix based on the switch matrix control signal, and map the signal of the third frequency band to the antenna array and transmit the signal of the third frequency band.

In accordance with another aspect of the disclosure, a method of a base station in a wireless communication system is provided. The method includes generating and outputting a signal of a first frequency band corresponding to a first frequency bandwidth, by a baseband (BB) processor of the base station, converting and outputting the signal of the first frequency band output from the baseband (BB) processor into a signal of a second frequency band corresponding to a second frequency bandwidth, by an intermediate frequency (IF) band processor of the base station, generating a switch matrix control signal for mapping one of at least one phase locked loop (PLL) to an antenna array, by a switch matrix controller of the base station, and converting the signal of the second frequency band into a signal of a third frequency band corresponding to a third frequency bandwidth using the at least one PLL and a switch matrix based on the switch matrix control signal, mapping the signal of the third frequency band to the antenna array, and transmitting the signal of the third frequency band, by a radio frequency (RF) band processor of the base station.

According to an embodiment of the disclosure, the configuration of a part of the RF chain for each arbitrary slot has the effect of considering the size of the frequency bandwidth of the frequency band that needs to operate as the size of the frequency bandwidth corresponding to the frequency band operated by one operator.

In addition, the implementation of components of base station equipment for sharing a wireless network infrastructure can be facilitated, component costs can be reduced, and power consumption can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the drawings, in which.

Throughout the drawings, it should be noted that like reference numbers are used to depict the same or similar elements, features, and structures.

DETAILED DESCRIPTION

Figure 1:
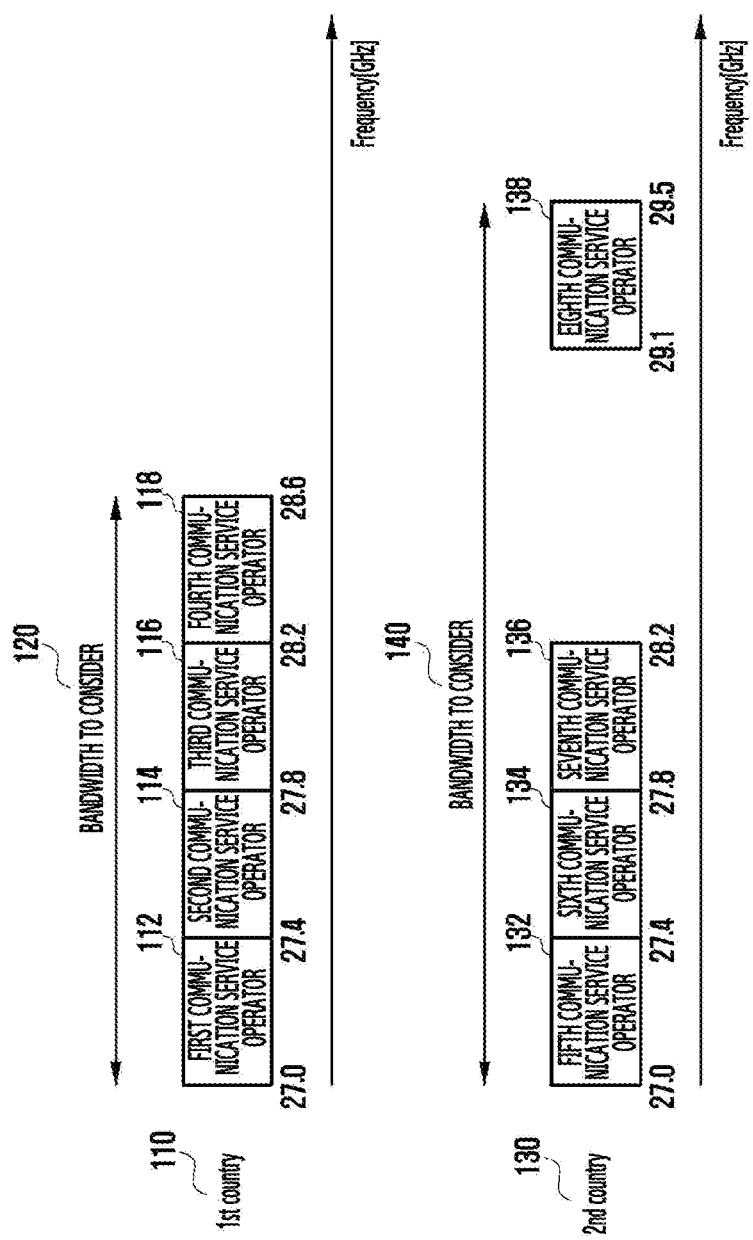
FIG. 1 is a diagram illustrating a frequency band allocated to a communication service operator for each country according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known in t functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components may be exaggerated, omitted, or schematically illustrated in the accompanying drawing. In addition, a size of each component may not fully reflect the actual size. The same or corresponding components in each drawing may be assigned the same reference number.

An advantage and a feature of the disclosure and a method for achieving them may become apparent with reference to the embodiments described below together with the accompanying drawing. The disclosure is not limited to the embodiments disclosed below, and may be implemented in different various forms. Only the embodiments are provided to make the disclosure of the disclosure complete, and to completely inform the scope of the disclosure to those skilled in the art to which the disclosure belongs, and the disclosure may be defined by the scope of the claim. Throughout the specification, the same reference numeral may refer to the same component.

In addition, each block may represent a module, segment, or part of code including one or more executable instructions for executing a specific logical function(s). In addition, in some alternative implementations, it may be possible for functions mentioned in blocks to occur out of order. For example, two blocks illustrated in succession may actually substantially be performed at the same time, or the blocks may sometimes be performed in reverse order according to the corresponding function.

In this case, the term '~unit' used in an embodiment of the disclosure means a software or hardware component, such as field programmable gate array (FPGA) or application-specific integrated circuit (ASIC), and '~unit' may perform certain roles. However, '~unit' may not mean limited to software or hardware. '~unit' may be configured to be in an addressable storage medium and may be configured to play one or more processors. Thus, as an example, '~unit' may include components, such as software components, object-oriented software components, class components, and task components, processes, functions, attributes, procedures, subroutines, program code segments, drivers, firmware, microcode, circuit, data, database, data structures, tables, arrays, and variables. The functions provided within the components and '~unit' may be combined into smaller numbers of components and '~units' or further separated into additional components and '~units'. In addition, the components and '~units' may be implemented to play one or more central processing units (CPUs) in a device or secure multimedia card. In addition, in an embodiment of the disclosure, the '~unit' may include one or more processor.

For convenience of description below, the disclosure may use terms and names defined in the 3rd generation partnership project long term evolution (3GPP LTE) or 3GPP fifth generation new radio (5G NR) standard. However, the disclosure is not limited by the terms and names, and may be equally applied to a system conforming to another standard.

With the development of wireless communication, the frequency band used for wireless communication is gradually increasing. More particularly, in order to achieve a high data rate, the 5G communication system is being considered for implementation in a super high frequency (mmWave) band (e.g., such as a 60 giga (60 GHz) band). In order to alleviate the path loss of radio waves in the super high frequency band and increase the transmission distance of radio waves, in the 5G communication system, beamforming, massive MIMO, full dimensional MIMO (FD-MIMO), array antenna, analog beam-forming, and large scale antenna technologies are being discussed.

As the frequency increases, the reach distance of the radio wave may decrease relatively. Thus, in the super high frequency band, the size of the cell that one base station should cover may gradually decrease. Accordingly, in order for each of the multiple communication service operators to support wireless communication, it is necessary to densely install base stations for each of the multiple communication service operators.

However, there may occur a case where the number of subscribers connected within a given cell area is significantly smaller than the communicable capacity of the base station, other than the downtown area. Accordingly, for efficient operation of the base station, the multiple communication service operators may increase the demand for sharing a wireless network infrastructure (RAN sharing). For example, the multiple communication service operators may share one base station equipment.

In case of RAN sharing, in order for one base station equipment to support the frequency band operated by the multiple communication service operators, the size of the frequency bandwidth of the frequency band that needs to operate becomes significantly larger than the size of the frequency bandwidth for support only to existing single communication service operator.

Thus, as the number of the communication service operators to support increases, the size of the frequency bandwidth of the frequency band in which an RF chain in the base station should operate may increase in order to share the wireless network infrastructure. However, as the size of the frequency bandwidth of the frequency band in which the RF chain should operate increases, the problem that it is difficult to implement components of the base station equipment, the component costs rapidly increases, and power consumption also increases rapidly may occur.

In order to address such issues, according to an embodiment of the disclosure, for each arbitrary slot, there is an effect of reducing the size of the frequency bandwidth of the frequency band that should operate in a part of configuration of the RF chain to the size of the frequency bandwidth corresponding to the frequency band operated by one operator, the implementation of the base station equipment components for sharing the wireless network infrastructure becomes easy, the component costs may be reduced, and the power consumption may be reduced.

Hereinafter, operation of the base station of the first embodiments and second embodiment of the disclosure for addressing the above object will be described with reference to the drawings.

FIG. 1 is a diagram illustrating a frequency band allocated to a communication service operator for each country according to an embodiment of the disclosure.

Referring to FIG. 1, in order to support RAN sharing for each country, sizes 120 and 140 of the frequency bandwidth of the frequency band that needs to operate may be different.

For example, in a first country 110, in order for a first communication service operator 112 to support wireless communication, the frequency band allocated from the first country 110 may be 27.0 GHz to 27.4 GHz, and the size of the frequency bandwidth may be 0.4 GHz. In addition, in the first country 110, in order for a second communication service operator 114 to support wireless communication, the frequency band allocated from the first country 110 may be 27.4 GHz to 27.8 GHz, and the size of the frequency bandwidth may be 0.4 GHz. In addition, in the first country 110, in order for a third communication service operator 116 to support wireless communication, the frequency band allocated from the first country 110 may be 27.8 GHz to 28.2 GHz, and the size of the frequency bandwidth may be 0.4 GHz. In addition, in the first country 110, in order for a fourth communication service operator 118 to support wireless communication, the frequency band allocated from the first country 110 may be 28.2 GHz to 28.6 GHz, and the size of the frequency bandwidth may be 0.4 GHz.

Accordingly, in the first country 110, in order for a base station to share the wireless network infrastructure with multiple communication service operators 112, 114, 116, and 118, the size 120 of the frequency bandwidth of the frequency band that needs to operate may be 1.6 GHz.

In addition, in a second country 130, in order for a fifth communication service operator 132 to support wireless communication, the frequency band allocated from the second country 130 may be 27.0 GHz to 27.4 GHz, and the size of the frequency bandwidth may be 0.4 GHz. In addition, in the second country 130, in order for a sixth communication service operator 134 to support wireless communication, the frequency band allocated from the second country 130 may be 27.4 GHz to 27.8 GHz, and the size of the frequency bandwidth may be 0.4 GHz. In addition, in the second country 130, in order for a seventh communication service operator 136 to support wireless communication, the frequency band allocated from the second country 130 may be 27.8 GHz to 28.2 GHz, and the size of the frequency bandwidth may be 0.4 GHz. In addition, in the second country 130, in order for an eighth communication service operator 138 to support wireless communication, the frequency band allocated from the second country 130 may be 29.1 GHz to 29.5 GHz, and the size of the frequency bandwidth may be 0.4 GHz.

Accordingly, in the second country 130, in order for the base station to share the wireless network infrastructure with multiple communication service operators 132, 134, 136, and 138, the size 140 of the frequency bandwidth of the frequency band that needs to operate may be 2.5 GHz.

The size of the frequency bandwidth of the frequency band that the base station should operate may be larger when operating in the frequency band of multiple communication service operators than when operating in the frequency band of one communication service operator. For example, the size of the frequency bandwidth of the frequency band that the base station should operate is 0.4 GHz in the first country and 0.4 GHz in the second country in case of supporting only one communication service operator, but in order to share the wireless network infrastructure (RAN sharing), the size of the frequency bandwidth of the frequency band that the base station should operate is 1.6 GHz in the first country and 2.5 GHz in the second country in the case of supporting multiple communication service operators.

In addition, depending on the frequency band operated by multiple communication service operators, the size of the frequency bandwidth of the frequency band that needs to operate for RAN sharing may vary. For example, as in the second country 130, in case that the frequency band operated by multiple communication service operators is not continuous (for example, a frequency width of 0.9 GHz exists between the frequency band of the seventh communication service operator and the frequency band of the eighth communication service operator), the size of the frequency bandwidth of the frequency band that the base station should operate may increase.

Thus, in order to support wireless network infrastructure sharing (RAN sharing), as components of the base station, the size of the frequency bandwidth of the frequency band that the modem, baseband (BB) processing unit, intermediate frequency (IF) band processing unit, and radio frequency (RF) band processing unit should operate may increase.

However, in order for each processing unit to cover a wide frequency bandwidth, the problem that it become difficult to implement components, the component costs increases, and power consumption also increases may occur.

Figure 2:
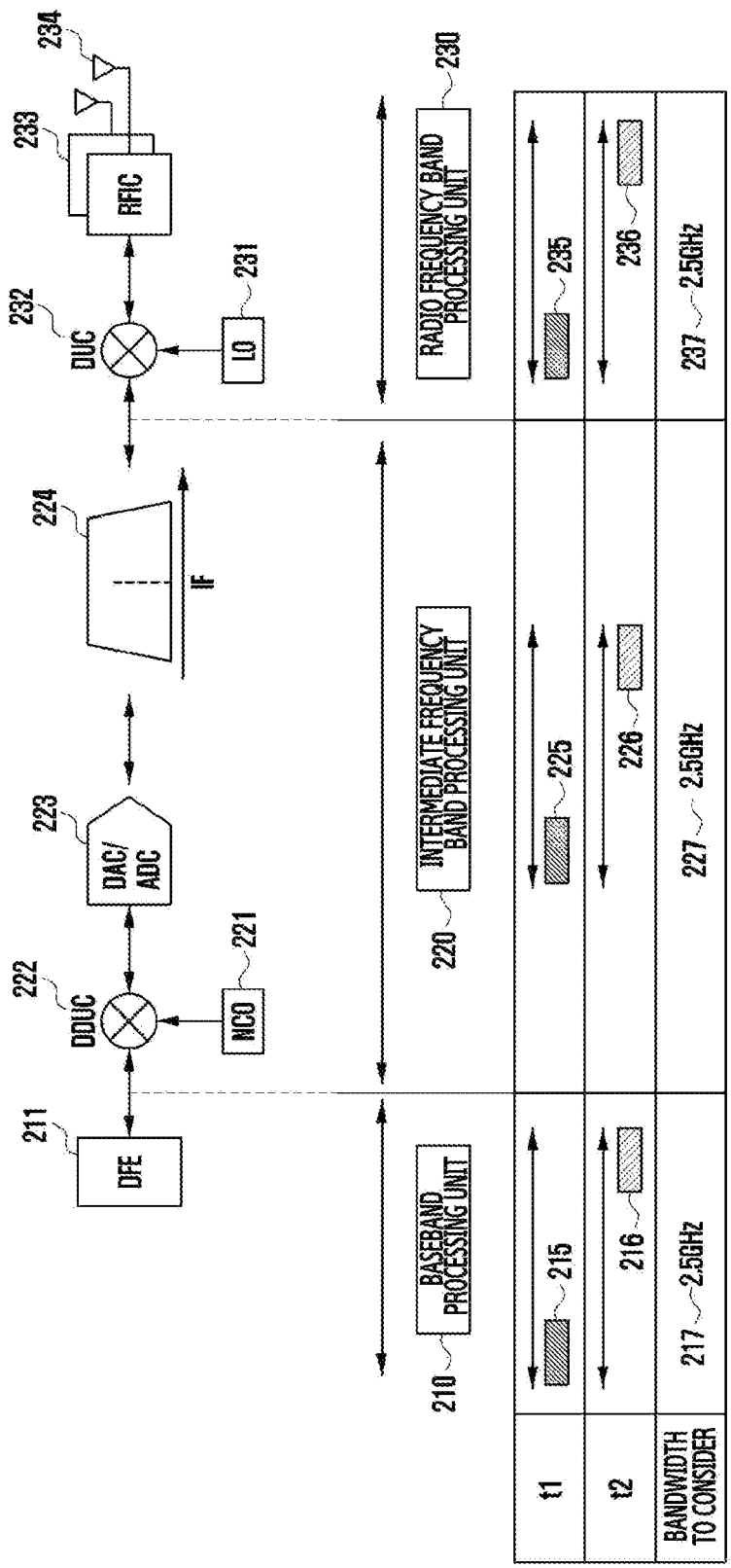
FIG. 2 is a diagram illustrating a size of a frequency bandwidth of a frequency band that should operate for each processing unit of an RF chain in a base station according to an embodiment of the disclosure.

FIG. 2 is a diagram illustrating a size of a frequency bandwidth of a frequency band that needs to operate for each processing unit of an RF chain in a base station according to an embodiment of the disclosure.

Referring to FIG. 2, in case of a second country 130, in the RF chain, which is a component of the base station, as the size of the frequency bandwidth of the frequency band that needs to operate for each processing unit increases, a problem that occurs may be known.

The base station may include a baseband (BB) processing unit 210, an intermediate frequency (IF) band processing unit 220, and a radio frequency (RF) band processing unit 230.

First, the baseband (BB) processing unit 210 may include a digital frontend (DFE) 211 unit.

The DFE unit 211 (411 in FIG. 4 and 511 in FIG. 5) is a part that performs up-conversion of frequency, down-conversion of frequency, filtering of channel, and the like through digital processing. In addition, the DFE unit 211 may play a role of disposing information bits for each channel so as to correspond to a frequency bandwidth through information from the modem and generating a baseband signal.

Second, the intermediate frequency (IF) band processing unit 220 may include a numerically controlled oscillator (NCO) 221 unit, a digital down/up converter (DDUC) 222 unit, digital analog converter (DAC) 223 unit, an analog digital converter (ADC) 223 unit, a band pass filter (BPF) 224 unit, and the like.

The NCO unit 221 is a digital signal generator for a specific frequency, and may generally generate a sine wave in a discrete form. A frequency generated by the NCO unit can be the same as a center frequency of the intermediate frequency band. In addition, an analog signal of the intermediate frequency band may be generated using the DDUC unit and the DAC unit.

In addition, the DDUC unit 222 is the digital down/up converter, and may mix the digital signal generated from the NCO unit 221 with the baseband signal generated from the DFE unit (i.e., a digital mixer), and then may up-convert it to the digital signal to an intermediate frequency band signal. In addition, on the contrary, the received intermediate frequency band signal may be downward converted to the baseband signal.

In addition, the DAC/ADC unit 223 (423 in FIG. 4 and 523 in FIG. 5) is a digital-analog conversion circuit unit, and may convert the digital signal into the analog signal or may convert the analog signal into the digital signal. Through the DAC/ADC unit 223, the analog signal of the intermediate frequency band may be generated.

In addition, the BPF unit 224 (424 in FIG. 4 and 524 in FIG. 5) is a band filter and may pass only the signal between specific frequencies in the generated analog signal of the intermediate frequency band.

Third, the radio frequency (RF) band processing unit 230 may include a local oscillator (LO) 231 unit, a down/up converter (DUC) 232 unit, a radio frequency integrated circuit (RFIC) 233 unit, an antenna array unit 234, and the like.

The LO unit 231 (431 in FIG. 4 and 531 in FIG. 5) is an analog signal generator for the specific frequency, and may generate the analog signal in a radio frequency band using an RF PLL (phase locked loop) and a DUC unit of the LO unit. In this case, the frequency generated by the LO unit may be combined with the center frequency of the intermediate frequency band to become a center frequency of the radio frequency band.

In addition, the DUC unit 232 (432 in FIG. 4 and 532 in FIG. 5) is the down/up converter, and may mix the generated frequency band signal with the analog signal generated from the LO unit 231 (i.e., a radio frequency mixer), and then may up-convert it to a radio frequency band signal. In addition, on the contrary, the received radio frequency band signal may be downward converted to the intermediate frequency band signal.

In addition, the RFIC unit 233 (433 in FIG. 4 and 533 in FIG. 5) is a radio frequency integrated circuit unit and may be applied to an integrated circuit operating in a frequency range suitable for wireless communication.

In addition, the antenna array unit 234 (434 in FIG. 4 and 534 in FIG. 5) is a set of several connected antennas, and may operate together as a single antenna to transmit and receive radio waves.

For example, in case of the second country 130, in order for the base station to support RAN sharing, the size of the frequency bandwidth of the frequency band that needs to operate by each of the baseband (BB) processing unit 210, the intermediate frequency (IF) band processing unit 220, and the radio frequency (RF) band processing unit 230 may be as follows.

At an arbitrary time t1, the fifth communication service operator may be supported 215, 225, 235, and at another arbitrary time t2, the eighth communication service operator may be supported 216, 226, 236. In this case, since all the base station should operate in each frequency band corresponding to each communication service operator, it may operate in the frequency band from 27.0 GHz, which is the smallest frequency of the fifth communication service operator, to 29.5 GHz, which is the largest frequency of the eighth communication service operator. In this way, the base station should operate in all frequency band capable of supporting communication (e.g., frequency band corresponding to the smallest frequency to the largest frequency). Thus, the size of the frequency bandwidth of the frequency band in which the baseband processing unit should operate may be 2.5 GHz 217, the size of the frequency bandwidth of the frequency band in which the intermediate frequency band processing unit should operate may be 2.5 GHz 227, and the size of the frequency bandwidth of the frequency band in which the radio frequency band processing unit should operate may be 2.5 GHz 237.

Thus, each processing unit of the base station may increase the size of the frequency bandwidth of the frequency band that needs to operate, compared to the case of supporting only one existing operator.

However, as described above, as the size of the frequency bandwidth of the frequency band that each processing unit should operate increases, there may be the problem that the size of hardware required for each processing unit increases, the size of power consumed increases, the implementation of the ADC/DAC unit becomes difficult, and the BPF does not properly filter unnecessary signals.

Therefore, in order to address such an issue, there is an effort to reduce the size of the frequency bandwidth of the frequency band that each processing unit must operate.

Figure 3:
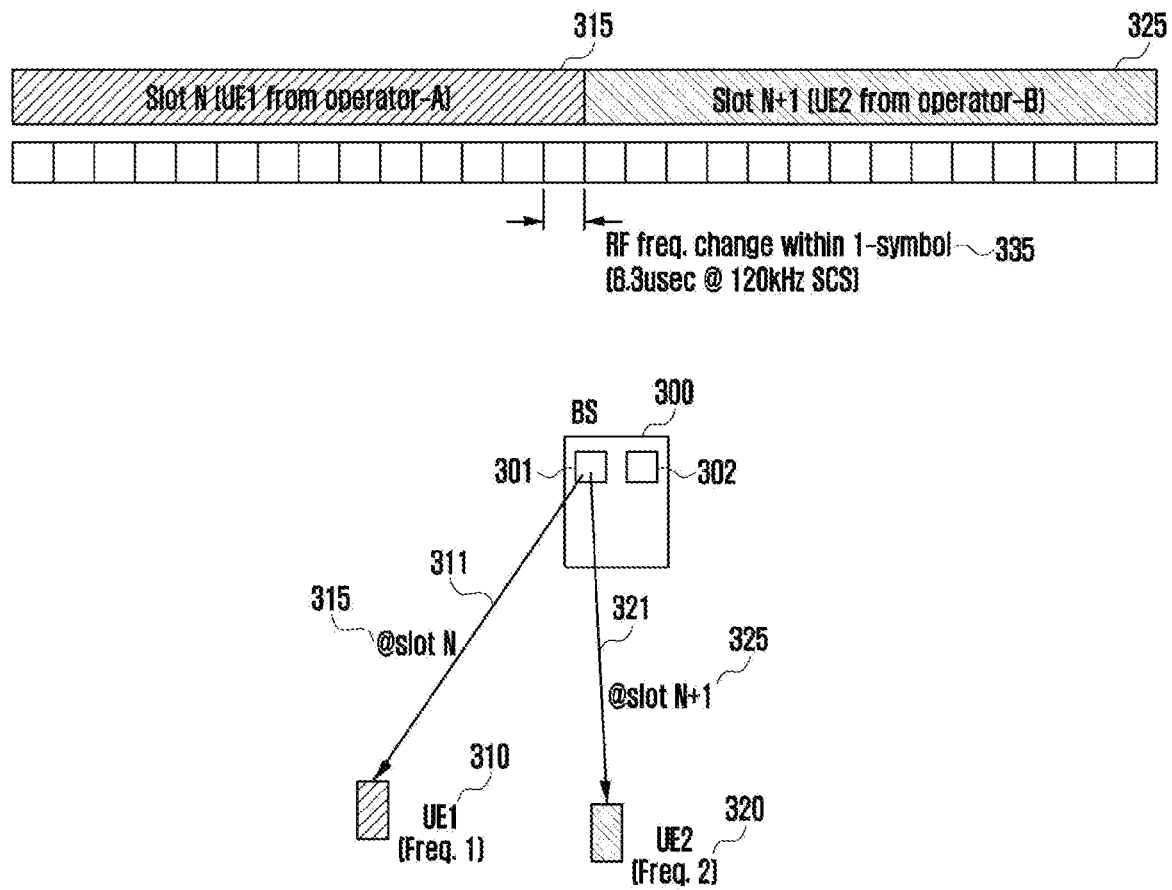
FIG. 3 is a diagram illustrating that a base station supports communication for one operator in an arbitrary slot in a wireless communication system according to an embodiment of the disclosure.

FIG. 3 is a diagram illustrating that a base station supports communication for one operator in an arbitrary slot in a wireless communication system according to an embodiment of the disclosure.

Referring to FIG. 3, in a 5G super high frequency (mm-Wave) band based on beamforming, even if the base station may support (RAN sharing) communication with terminals registered in multiple communication service operators, only one beam may be formed in one antenna array, and the beam may not communicate with two terminals at the same time. In addition, since the direction of the beam of one antenna array in one slot is determined, the beam may be used for communication with one terminal.

The meaning of the slot may mean a scheduling unit. The scheduling unit may mean a transmission time interval (TTI), may be configured with at least one continuous orthogonal frequency division multiplexing (OFDM) symbol unit. For example, the TTI may include the slot, a subframe, and the like according to a communication standard.

Thus, referring to FIG. 3, a base station 300 may include an antenna array 301 and an antenna array 302. In case of an arbitrary slot N 315, one beam 311 formed in the antenna array 301 of the base station 300 may be used only to support a communication service operator A 310. In addition, in case of an arbitrary slot N+1 325, another one beam 321 formed in the antenna array 301 of the base station 300 may be used only to support a communication service operator B 320.

Thus, based on one slot, a size of a frequency bandwidth required for the base station to support multiple communication service operators may be sufficient if it is the size of the frequency band operated by one operator. This is because one beam corresponds to only one communication service operator based on one slot. In addition, in order to support multiple communication service operators, the RF frequency may be changed for each slot and may sequentially supported in a manner corresponding to other communication service operators 335.

Thus, in an embodiment of the disclosure, the size of the frequency bandwidth of the frequency band that each processing unit of the base station should operate may be reduced to the size of the frequency bandwidth operated by one operator. In addition, in order to change the RF frequency in an arbitrary slot, a structure in which the frequency band of the signal output from a NCO unit in an intermediate frequency band processing unit and the frequency band of the signal output from a LO unit in a radio frequency band processing unit are varied in the arbitrary slot may be applied.

Figure 4:
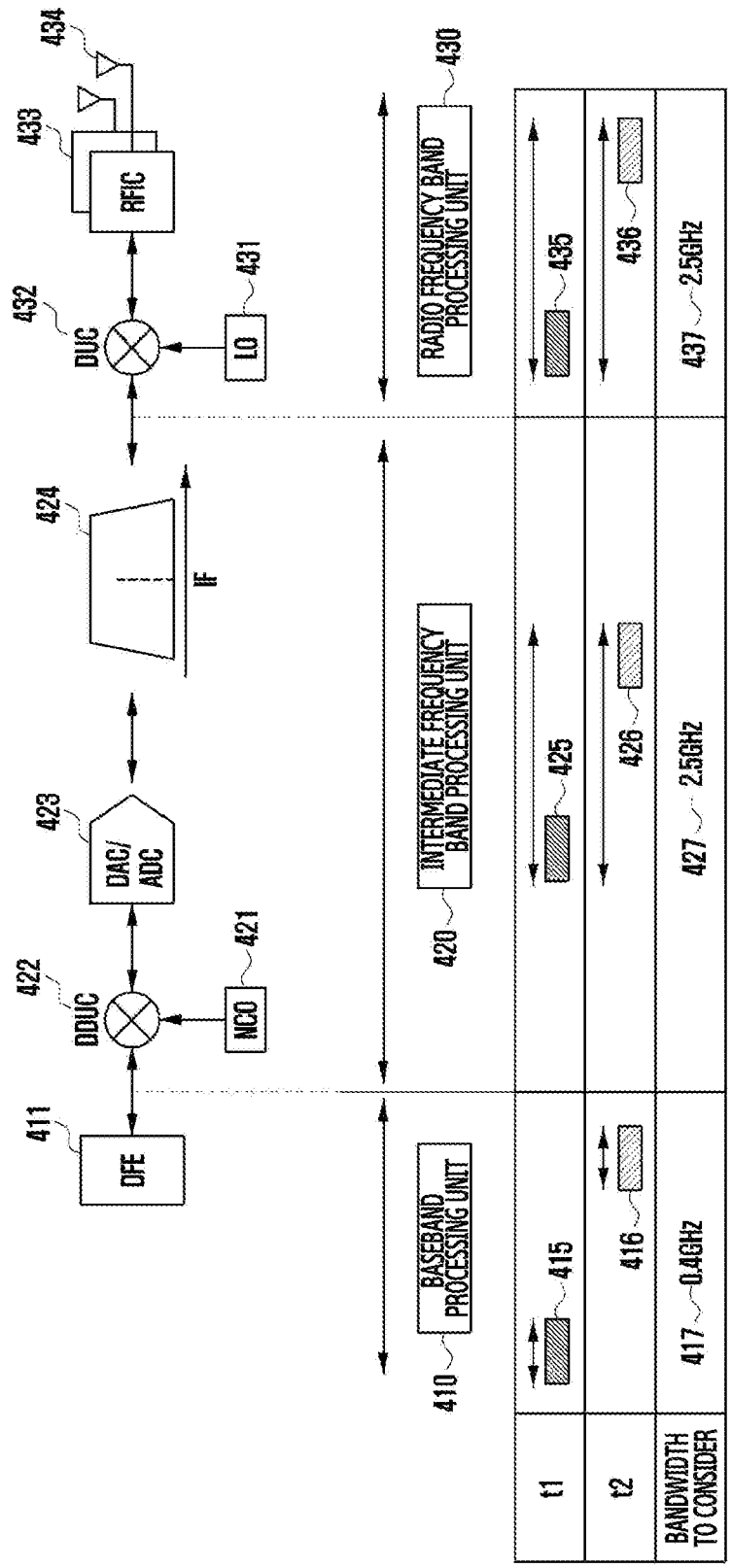
FIG. 4 is a diagram illustrating a size of a frequency bandwidth of a frequency band that needs to operate by each processing unit of an RF chain according to a change in a numerically controlled oscillator (NCO) in a base station according to an embodiment of the disclosure.

FIG. 4 is a diagram illustrating a size of a frequency bandwidth of a frequency band that needs to operate by each processing unit of an RF chain according to a change in a numerically controlled oscillator (NCO) in a base station according to an embodiment of the disclosure.

Referring to FIG. 4, a frequency band of a signal output from an NCO unit 421 (521 in FIG. 5) in an intermediate frequency band processing unit 420 may be changed in an arbitrary slot so that the intermediate frequency band may be changed to correspond to a frequency band operated by multiple communication service operators.

The intermediate frequency band processing unit 420 changes the frequency band of the signal output from the NCO unit 421 in the arbitrary slot. In addition, the intermediate frequency band processing unit 420 may generate an analog signal in the intermediate frequency band by mixing the signal output from the NCO unit 421 and the signal generated by a baseband processing unit using a DDUC unit 422 (522 in FIG. 5). In this case, the size of the frequency bandwidth of the signal generated by the baseband processing unit before the mixing may correspond to the size of the frequency bandwidth of the frequency band for supporting one operator.

For example, in case of the second country 130, in order for the base station to support RAN sharing, the size of the frequency bandwidth of the frequency band that needs to operate by each of a baseband processing unit 410, the intermediate frequency band processing unit 420, and a radio frequency band processing unit 430 may be as follows.

In the case of supporting 415, 425, 435 a fifth communication service operator at an arbitrary time t1 and supporting 416, 426, 436 an eighth communication service operator at another arbitrary time t2, the size of the frequency bandwidth of the frequency band in which the baseband processing unit should operate may be 0.4 GHz, which is the size of the frequency bandwidth for supporting one operator 417, the size of the frequency bandwidth of the frequency band in which the intermediate frequency band processing unit should operate may be 2.5 GHz 427, and the size of the frequency bandwidth of the frequency band in which the radio frequency band processing unit should operate may be 2.5 GHz 437.

Thus, since the size of the frequency bandwidth of the frequency band in which the baseband processing unit should operate is reduced, there may be the effect that it may become easy to implement the baseband processing unit, a component cost may become reduced, and power consumption may also be reduced.

Figure 5:
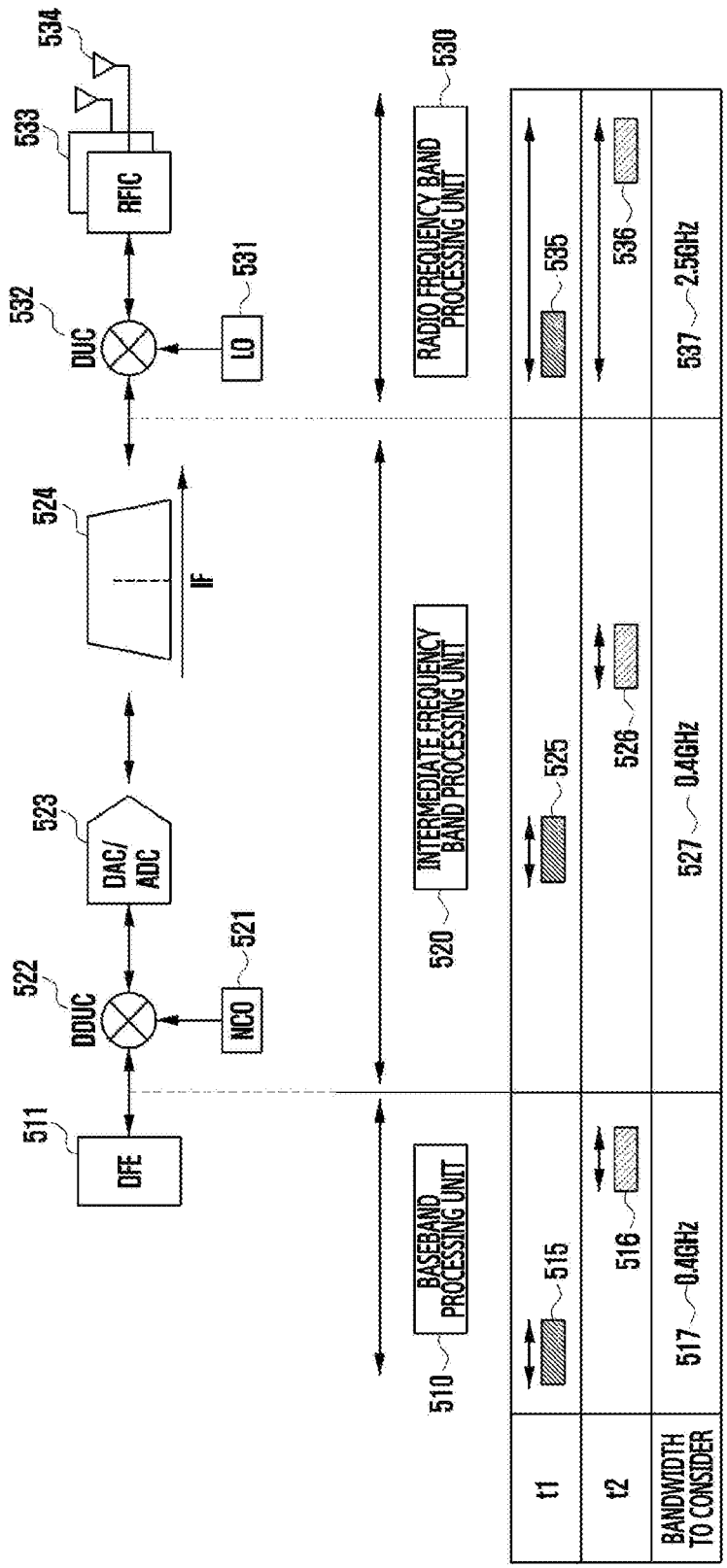
FIG. 5 is a diagram illustrating a size of a frequency bandwidth of a frequency band that needs to operate for each processing unit of an RF chain according to a change in a local oscillator (LO) in a base station according to an embodiment of the disclosure.

FIG. 5 is a diagram illustrating a size of a frequency bandwidth of a frequency band that needs to operate for each processing unit of an RF chain according to a change in a local oscillator (LO) in a base station according to an embodiment of the disclosure.

Referring to FIG. 5, a frequency band of a signal output from a LO unit 531 in a radio frequency band processing unit 530 may be changed in an arbitrary slot so that a radio frequency band may be changed to correspond to a frequency band operated by multiple communication service operators.

The radio frequency band processing unit 530 changes the frequency band of the signal output from the LO unit 531 in the arbitrary slot. In addition, the radio frequency band processing unit 530 may generate an analog signal in the radio frequency band by mixing the signal output from the LO unit 531 and a signal generated by an intermediate frequency band processing unit 520 using a DUC unit 532. In this case, the size of the frequency bandwidth of the signal output from the baseband processing unit before mixing and the size of the frequency bandwidth of the signal output from the intermediate frequency band processing unit may correspond to the size of the frequency bandwidth for supporting one operator.

For example, in case of the second country 130, in order for the base station to support RAN sharing, the size of the frequency bandwidth of the frequency band that needs to operate by each of a baseband processing unit 510, the intermediate frequency band processing unit 520, and the radio frequency band processing unit 530 may be as follows.

At an arbitrary time t1, the fifth communication service operator may be supported 515, 525, 535, and at another arbitrary time t2, the eighth communication service operator may be supported 516, 526, 536. In this case, the size of the frequency bandwidth of the frequency band in which the baseband processing unit should operate may be 0.4 GHz, which is the size of the frequency bandwidth for supporting one operator 517, the size of the frequency bandwidth of the frequency band in which the intermediate frequency band processing unit should operate may be 0.4 GHz, which is the size of the frequency bandwidth for supporting one operator 527, and the size of the frequency bandwidth of the frequency band in which the radio frequency band processing unit should operate may be 2.5 GHz 537.

Thus, since the size of the frequency bandwidth of the frequency band in which the baseband processing unit and the intermediate frequency band processing unit should operate is reduced, there may be the effect that it may become easy to implement the baseband processing unit and the intermediate frequency band processing unit, a component cost may become reduced, and power consumption may also be reduced.

In addition, in order to obtain the above effect, in case of FIGS. 4 and 5, it is necessary to rapidly change the frequency band of the signal generated by the NCO unit and the LO unit according to the frequency band corresponding to each communication service operator in the arbitrary slot. More particularly, in order to implement the LO unit, a method of implementing RF phase locked loop (PLL) (hereinafter, RF PLL and PLL will be used interchangeably) and converting the frequency band through a switching method may be considered.

Figure 6:
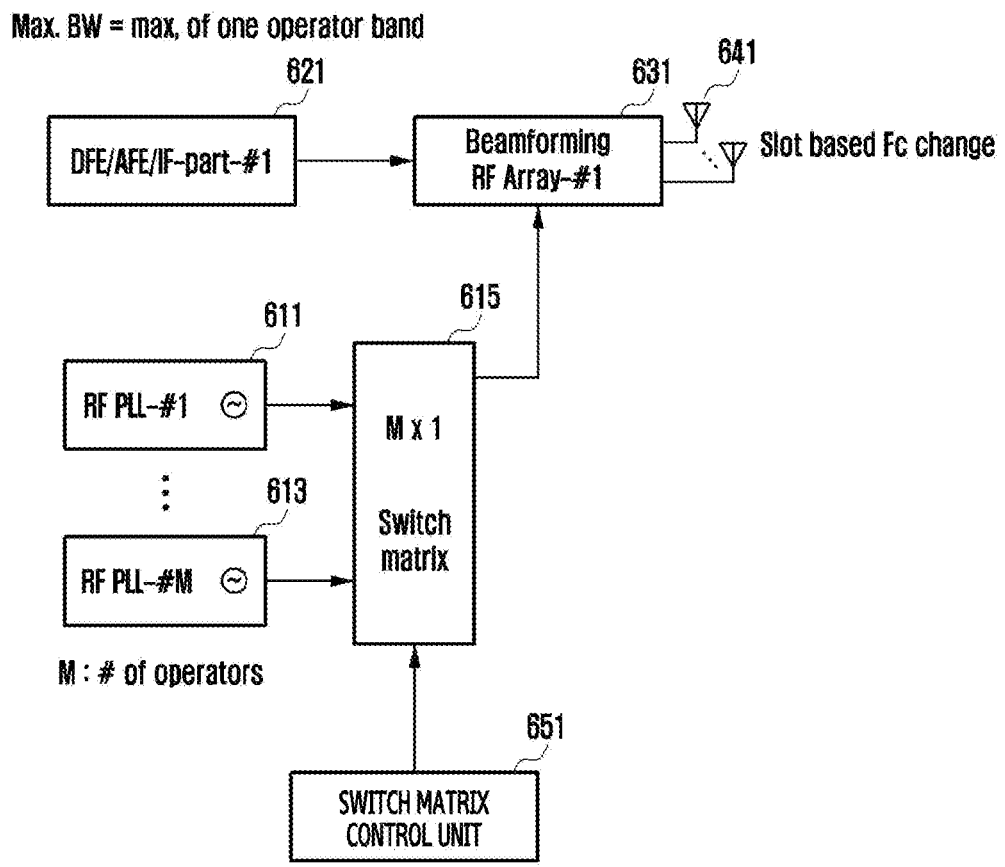
FIG. 6 is a diagram illustrating one RF chain, a plurality of RF phase locked loops (PLLs), a switch matrix, and a switch matrix control unit in a base station according to an embodiment of the disclosure.

FIG. 6 is a diagram illustrating one RF chain, a plurality of RF phase locked loops (PLLs), a switch matrix, and a switch matrix control unit in a base station according to an embodiment of the disclosure.

Referring to FIG. 6, the base station according to the second embodiment of the disclosure may include a baseband processing unit 621, an intermediate frequency band processing unit 621, a radio frequency band processing unit 611, 613, 615, 631, 641, and a switch matrix control unit 651, and a LO unit in the radio frequency band processing unit may include RF PLLs 611, 613 and a switch matrix 615.

The RF PLLs 611 and 613 are phase locked loop and may be used to fix the frequency of an analog signal by fixing a phase. Through this, it is possible to fix the variation of the frequency of the signal output from the LO unit. In addition, a voltage controlled oscillator (VCO) (not illustrated) of the RF PLL is an oscillator that generates a specific frequency according to an input voltage, and may output the analog signal corresponding to a frequency band of multiple communication service operators. Accordingly, each of the RF PLLs 611 and 613 may output the analog signal having a frequency corresponding to each of different communication service operators.

For example, assuming that the number of multiple communication service operators is an arbitrary number and a total of M, RF PLL-#1 611 may output the analog signal having the frequency corresponding to the first communication service operator, and RF PLL-#M 613 may output the analog signal having the frequency corresponding to the $M^{th}$ communication service operator.

The switch matrix 615 may be connected to a plurality of RF PLLs 611 and 613. In addition, the switch matrix 615 may change a switch to map the antenna array 631 and the RF PLLs for each arbitrary slot according to a switch matrix control signal inputted from the switch matrix control unit 651.

In addition, the switch matrix control unit 651 may determine the communication service operator to support communication through the antenna array for each arbitrary slot based on a predetermined scheduling standard, may input a switch matrix control signal to the switch matrix so that the RF PLL having a frequency corresponding to the communication service operator determined by the switch matrix control unit is mapped with the antenna array.

In addition, the switch matrix control unit 651 may require scheduling information to determine based on the predetermined scheduling standard. The scheduling information may receive scheduling information in the arbitrary slot from a scheduler of the base station, the scheduling information in the arbitrary slot may be generated in the switch matrix control unit.

Figure 7A:
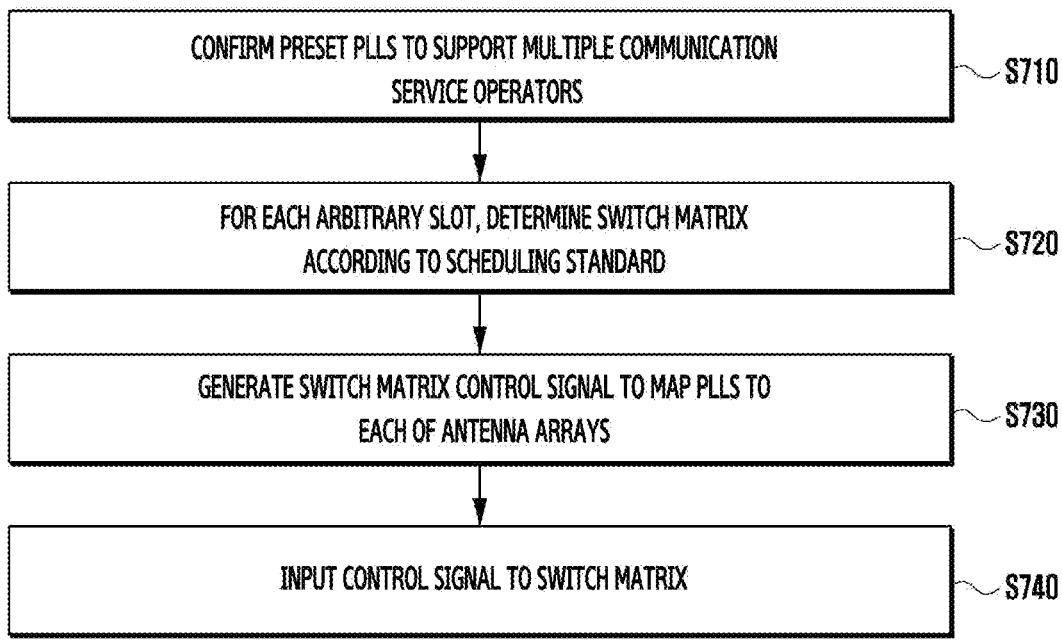
FIG. 7A is a diagram illustrating a flowchart of a switch matrix control unit in a base station according to an embodiment of the disclosure.

FIG. 7A is a diagram illustrating a flowchart of a switch matrix control unit in a base station according to an embodiment of the disclosure.

Referring to FIG. 7A, a flowchart of an operation of the switch matrix control unit in the second embodiment is illustrated, and each operation is divided and expressed as follows.

In operation S710, the switch matrix control unit may confirm preset RF PLLs to support multiple communication service operators. For example, it may confirm that RF PLL #1 may support a first communication service operator. In addition, it may confirm that RF PLL #2 may support a second communication service operator, and RF PLL #M may support a Mth communication service operator.

Then, in operation S720, the switch matrix control unit may determine the switch matrix for each arbitrary slot according to a predetermined scheduling standard.

The predetermined scheduling standard may include at least one of a ratio of the number of terminals of each communication service operator connected to the base station in a corresponding cell and data throughput required by each network of each communication service operator.

When at least one communication service operator that should be supported is determined according to the predetermined scheduling standard, the switch matrix may be determined to support the corresponding communication service operator.

When the switch matrix is determined, in operation S730, the switch matrix control unit may generate a switch matrix control signal.

And, in operation S740, the switch matrix control unit may input the switch matrix control signal to the switch matrix. Through the switch matrix control signal, the switch matrix may change a switch to map the RF PLL corresponding to the communication service operator that has determined to support to at least one antenna array.

Figure 7B:
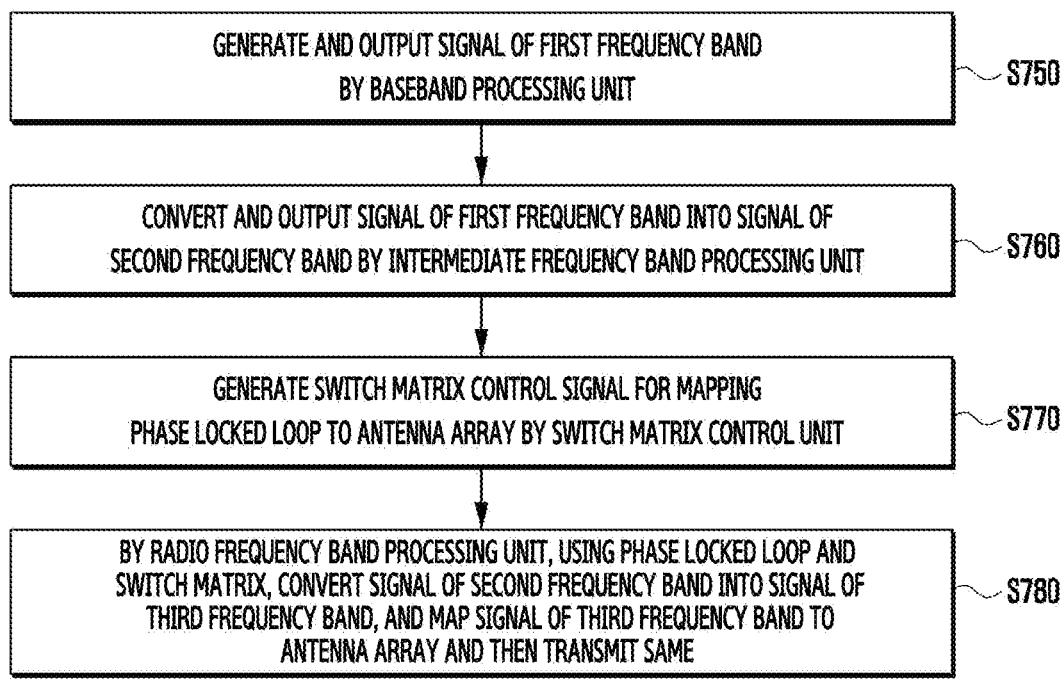
FIG. 7B is a diagram illustrating a flowchart of a base station in a base station according to an embodiment of the disclosure.

FIG. 7B is a diagram illustrating a flowchart of a base station in a base station according to an embodiment of the disclosure.

Referring to FIG. 7B, a flowchart of an operation of the base station in the second embodiment is illustrated, and each operation is divided and expressed as follows.

In operation S750, the base station may generate and may output a signal of a first frequency band corresponding to a first frequency bandwidth by a baseband (BB) processing unit of the base station.

In addition, the baseband processing unit may further include a DFE unit that generates information bits for each channel.

And, in operation S760, the base station may convert the signal of the first frequency band output from the baseband processing unit into a signal of the second frequency band corresponding to the second frequency bandwidth by the intermediate frequency (IF) band processing unit of the base station and may output the converted signal. In this case, a size of the first frequency bandwidth and a size of the second frequency bandwidth may be the same.

In addition, in operation S770, the base station may generate a switch matrix control signal for mapping one of at least one phase locked loop (PLL) to an antenna array by a switch matrix control unit of the base station. In this case, each of the at least phase locked loop (PLL) may correspond to a frequency band operated by different communication service operators.

And in operation S780, by a radio frequency (RF) band processing unit of the base station, the base station may convert the signal in the second frequency band into the signal in the third frequency band corresponding to the third frequency bandwidth using the switch matrix based on the at least one phase locked loop (PLL) and the switch matrix control signal, and may transmit the signal of the third frequency band by mapping to the antenna array.

In addition, the intermediate frequency band processing unit may include a numerically controlled oscillator (NCO) unit that generates a digital signal of a fourth frequency band. And it may include a converter configured to convert a signal in the first frequency band into a digital signal in the second frequency band and converts a digital signal in the second frequency band into a signal in the second frequency band by using the digital signal of the fourth frequency band. In this case, the center frequency of the fourth frequency band may be the same as the center frequency of the second frequency band.

In addition, the phase locked loop (PLL) may generate an analog signal of a fifth frequency band. The radio frequency band processing unit may include the converter configured to convert a signal of the second frequency band into a signal of the third frequency band by using the analog signal of the fifth frequency band. In this case, the center frequency of the third frequency band may be equal to the sum of the center frequency of the second frequency band and the center frequency of the fifth frequency band.

Figure 8:
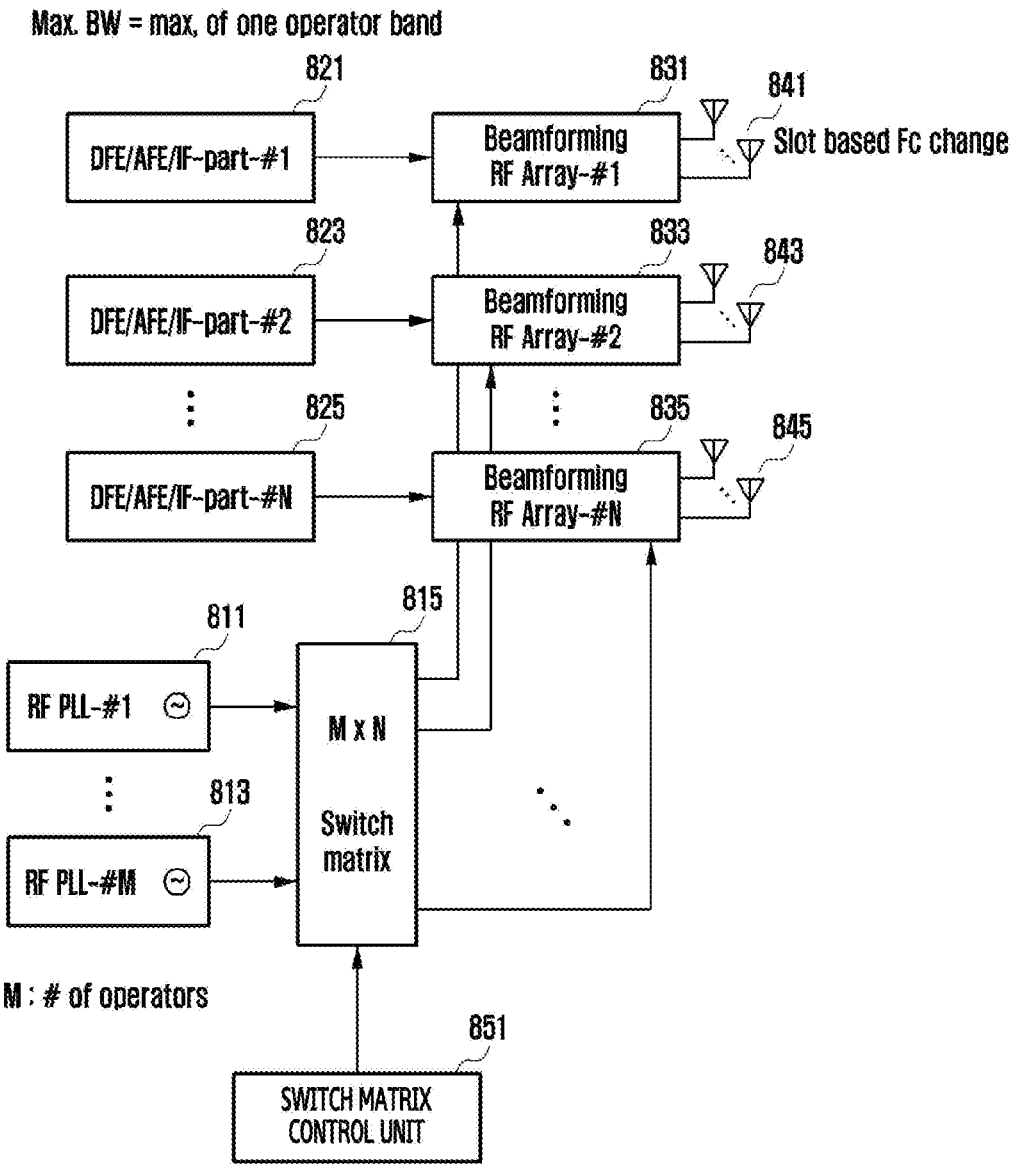
FIG. 8 is a diagram illustrating a plurality of RF chains, a plurality of RF phase locked loops (PLLs), a switch matrix, and a switch matrix control unit in a base station according to an embodiment of the disclosure.

FIG. 8 is a diagram illustrating a plurality of RF chains, a plurality of RF phase locked loops (PLLs), a switch matrix, and a switch matrix control unit in a base station according to an embodiment of the disclosure.

Referring to FIG. 8, the base station according to the second embodiment of the disclosure may include baseband processing units 821, 823, 825, intermediate frequency band processing units 821, 823, 825, radio frequency band processing units 811, 813, 815, 831, 833, 835, 841, 843, 845, and a switch matrix control unit 851, and a LO unit in the radio frequency band processing unit may include RF PLLs 811 and 813 and a switch matrix 815.

There may be a plurality of baseband processing units 821, 823, and 825 and intermediate frequency band processing units 821, 823, and 825, and may be a plurality of antenna arrays 831, 833, and 835. In addition, in order to map the RF PLL corresponding to the plurality of antenna arrays 831, 833, and 835, the switch matrix 815 may have a switch matrix structure of [M×N].

Figure 9:
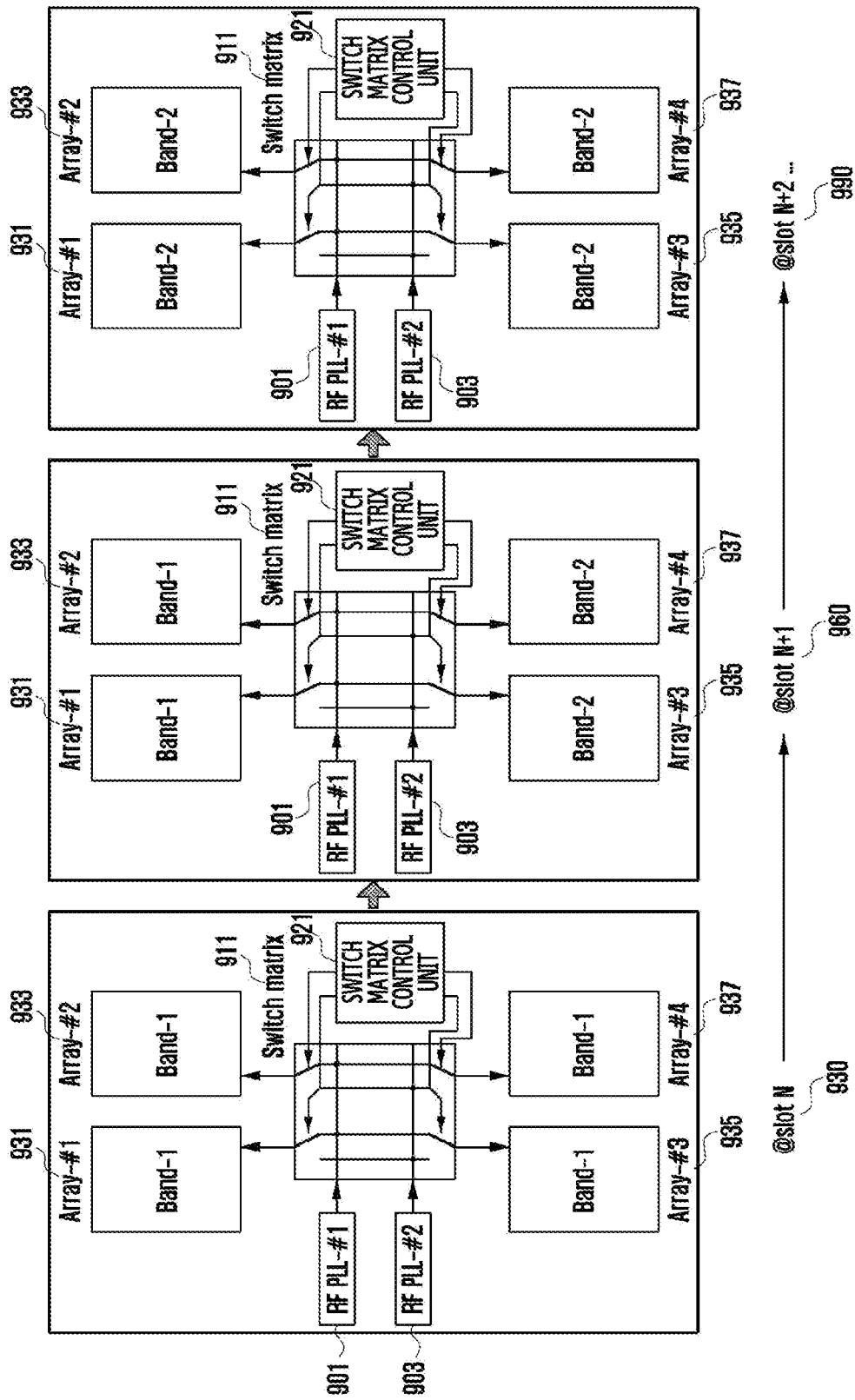
FIG. 9 is a diagram illustrating a mapping relationship between an antenna array and an RF PLL according to a switch matrix control unit in a base station according to an embodiment of the disclosure.

FIG. 9 is a diagram illustrating a mapping relationship between an antenna array and an RF PLL according to a switch matrix control unit in a base station according to an embodiment of the disclosure.

Referring to FIG. 9, at least one or more antenna arrays may correspond to each network of each communication service operator by using at least one or more RF PLLs, a switch matrix, and the switch matrix control unit in an arbitrary slot.

For example, the RF PLL-#1 901 may output an analog signal having a frequency corresponding to the first communication service operator, and the RF PLL-#2 903 may output an analog signal having a frequency corresponding to the second communication service operator. In addition, a total of four antenna arrays 931, 933, 935, 937 may be included in one base station.

In an arbitrary slot N 930, a switch matrix control unit 921 may input a switch matrix control signal controlling the switch matrix according to a predetermined scheduling standard to a switch matrix 911. The switch matrix 911 receiving the switch matrix control signal may support a communication service to the total of four antenna arrays 931, 933, 935, and 937 using beamforming for the first communication service operator. In this case, since all of the antenna arrays 931, 933, 935, and 937 correspond to the network of the same first communication service operator, the RF PLL allocated to the corresponding arrays may be the same RF PLL-#1 901.

In an arbitrary slot N+1 960, the switch matrix control unit 921 may input the switch matrix control signal controlling the switch matrix according to the predetermined scheduling standard to the switch matrix 911. The switch matrix 911 receiving the switch matrix control signal may set mapping on the two antenna arrays 931 and 933 to support a communication service using beamforming for the first communication service operator, and may set mapping on the remaining two antenna arrays 935 and 937 to support a communication service using beamforming for the second communication service operator. In this case, since the two antenna arrays 931 and 933 correspond to the same network of the first communication service operator, the RF PLL allocated to the corresponding antenna arrays may be the same RF PLL-#1 901. In addition, since the remaining two antenna arrays 935 and 937 correspond to the same network of the second communication service operator, the RF PLL allocated to the corresponding antenna arrays may be the same RF PLL-#2 903.

In an arbitrary slot N+2 990, the switch matrix control unit 921 may input a switch matrix control signal controlling the switch matrix according to the predetermined scheduling standard to the switch matrix 911. The switch matrix 911 receiving the switch matrix control signal may support the communication service to the total of four antenna arrays 931, 933, 935, and 937 using beamforming for the second communication service operator. In this case, since all of the antenna arrays 931, 933, 935, and 937 correspond to the network of the same second communication service operator, the RF PLL allocated to the corresponding arrays may be the same RF PLL-#2 902.

Figure 10:
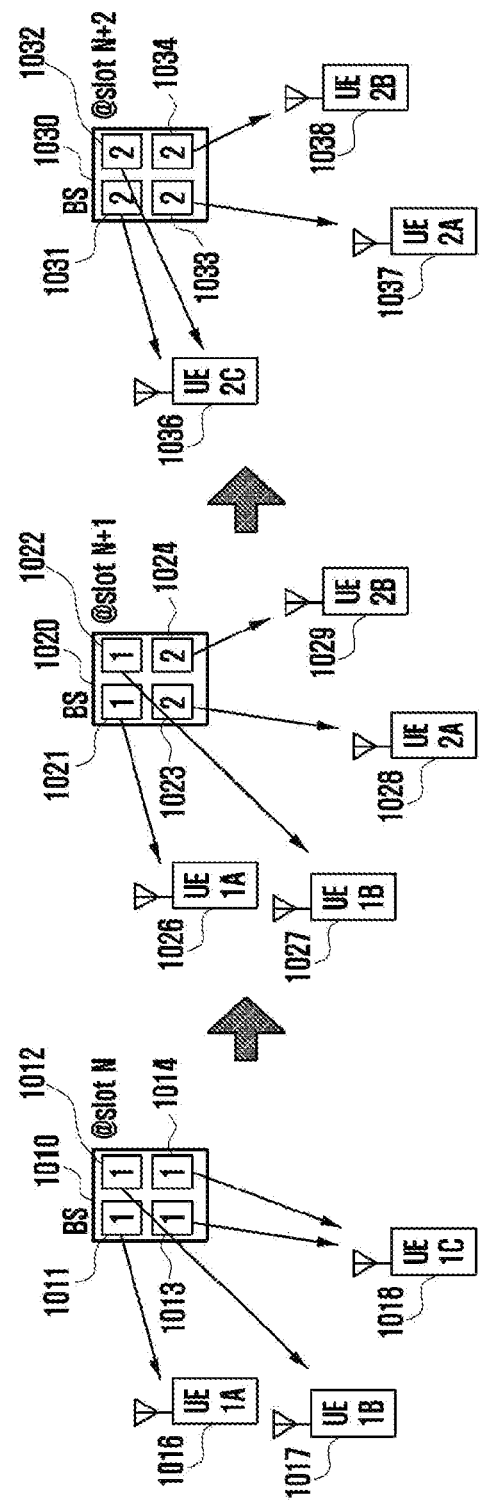
FIG. 10 is a diagram illustrating a mapping relationship between antenna arrays and terminals in a base station according to an embodiment of the disclosure.

FIG. 10 is a diagram illustrating a mapping relationship between antenna arrays and terminals in a base station according to an embodiment of the disclosure.

Referring to FIG. 10, at least one or more antenna arrays may support a communication service by using beamforming to a terminal of a corresponding communication service operator in an arbitrary slot.

In an arbitrary slot N 1010, a total of four antenna arrays 1011, 1012, 1013, and 1014 may support the communication service by using beamforming for a first communication service operator. Thus, the total of four antenna arrays 1011, 1012, 1013, and 1014 may support the communication service to the terminal supported by the first communication service operator by using beamforming. In addition, in case that the corresponding terminal is in an environment in which communication is difficult with only one antenna array, the communication service may be supported by using beamforming from at least one or more antenna arrays 1016, 1017, or 1018.

In an arbitrary slot N+1 1020, the two antenna arrays 1021 and 1022 may support the communication service by using beamforming for the first communication service operator, the remaining two antenna arrays 1023 and 1024 may support the communication service by using beamforming for the second communication service operator. Thus, the two antenna arrays 1021 and 1022 may support the communication service to the terminal supported by the first communication service operator by using beamforming, the remaining two antenna arrays 1023 and 1024 may support the communication service to the terminal supported by the second communication service operator by using beamforming from at least one or more antenna arrays 1026, 1027, 1028, or 1029.

In an arbitrary slot N+2 1030, a total of four antenna arrays 1031, 1032, 1033, and 1034 may support the communication service by using beamforming for the second communication service operator. Thus, the total of four antenna arrays 1031, 1032, 1033, and 1034 may support the communication service by using beamforming supported by the second communication service operator. In addition, in case that the corresponding terminal is in the environment in which communication is difficult with only one antenna array, the communication service may be supported by using beamforming from at least one or more antenna array 1036, 1037, or 1038.

Thus, according to an embodiment of the disclosure, in the configuration of a part of the RF chain for each arbitrary slot, there is an effect of considering the size of the frequency bandwidth of the frequency band that needs to operate as the size of the frequency bandwidth of the frequency band operated by one operator.

In addition, implementation of components of base station equipment for sharing wireless network infrastructure may be facilitated, component costs may be reduced, and power consumption may be reduced.

Methods according to the embodiments described in the claims or the specification of the disclosure may be implemented in the form of hardware, software, or a combination of hardware and software.

When implemented as software, a computer-readable storage medium storing one or more program (software module) may be provided. The one or more program stored in the computer-readable storage medium may be configured for execution by one or more processor in the electronic device. The one or more program include instructions that cause the electronic device to execute methods according to embodiments described in the claim or the specification of the disclosure.

Such program (software modules, software) may be stored in random access memory, non-volatile memory including flash memory, read only memory (ROM), electrically erasable programmable read only memory (EEPROM), magnetic disc storage device, a compact disc-ROM (CD-ROM), digital versatile disc (DVD) or other form of optical storage, magnetic cassette. Alternatively, it may be stored in a memory configured with some or all combinations thereof. In addition, each configuration memory may be included a plurality.

In addition, the program may be stored in an attachable storage device that may be accessed through a communication network, such as the Internet, Intranet, local area network (LAN), wide area network (WAN), or storage area network (SAN), or a combination thereof. Such a storage device may be connected to a device performing an embodiment of the disclosure through an external port. In addition, a separate storage device on the communication network may access a device performing an embodiment of the disclosure.

In the above-described specific embodiments of the disclosure, the component included in the disclosure is expressed in singular or plural according to the presented specific embodiment. However, singular or plural expression is chosen appropriately for the situation presented for convenience of explanation, and the disclosure is not limited to singular or plural component, and even if the component is expressed in plural, it may be configured with singular, or even if it is expressed in singular, it may be configured with plural.

Meanwhile, embodiments of the disclosure disclosed in the specification and drawings is only proposing a specific example to easily explain the technical content of the disclosure and to help understanding of the disclosure, and is not intended to limit the scope of the disclosure. In other words, it is obvious to a person with ordinary knowledge in the technical field to which the disclosure belongs that other modified examples based on the technical idea of the disclosure may be implemented. In addition, each of the above embodiments may be operated in combination with each other as necessary. For example, parts of an embodiment of the disclosure and another embodiment may be combined with each other to operate the base station and the terminal. For example, parts of a plurality of embodiments of the disclosure may be combined with each other to operate the base station and the terminal. In addition, the above embodiments have been presented based on the frequency division duplex (FDD) LTE system, but other modifications based on the technical idea of the above embodiment may be implemented in other systems, such as the time division duplex (TDD) LTE system, 5G or NR system.

In the specific embodiments of the disclosure described above, the components included in the disclosure are expressed in the singular or the plural according to the specific embodiment presented. However, the singular or the plural expressions are chosen appropriately for the situation presented for convenience of explanation, and the disclosure is not limited to singular or plural components, even if the components are expressed in plural, they may be configured in singular, or even if they are expressed in singular, they may be configured in plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A base station in a wireless communication system, the base station comprising:
    a baseband (BB) processor configured to generate and output a signal of a first frequency band corresponding to a first frequency bandwidth;
    an intermediate frequency (IF) band processor configured to convert and output the signal of the first frequency band output from the baseband processor into a signal of a second frequency band corresponding to a second frequency bandwidth;
    a switch matrix processor configured to generate a switch matrix control signal for mapping one of at least one phase locked loop (PLL) to an antenna array; and
    a radio frequency (RF) band processor configured to:
        convert the signal of the second frequency band into a signal of a third frequency band corresponding to a third frequency bandwidth using the at least one PLL and a switch matrix based on the switch matrix control signal, and
        map the signal of the third frequency band to the antenna array and transmit the signal of the third frequency band.

2. The base station of claim 1, wherein each of the at least one PLL corresponds to a frequency band operated by different communication service operators.

3. The base station of claim 1, wherein a size of the second frequency bandwidth is smaller than a size of the third frequency bandwidth.

4. The base station of claim 1, wherein a size of the first frequency bandwidth is equal to the size of the second frequency bandwidth.

5. The base station of claim 1, wherein the baseband processor further includes a digital frontend (DFE) configured to generate an information bit for each channel.

6. The base station of claim 1,
    wherein the intermediate frequency (IF) band processor further includes:
        a numerically controlled oscillator (NCO) configured to generate a digital signal of a fourth frequency band, and
        a converter configured to convert the signal of the first frequency band into a digital signal in the second frequency band using the digital signal of the fourth frequency band, and converts the digital signal in the second frequency band into an analog signal of the second frequency band, and
    wherein a center frequency of the fourth frequency band is equal to a center frequency of the second frequency band.

7. The base station of claim 1,
    wherein the PLL generates an analog signal of a fifth frequency band, wherein the radio frequency band processor further includes a converter configured to convert the signal of the second frequency band into a signal of the third frequency band using the analog signal of the fifth frequency band, and wherein a center frequency of the third frequency band is equal to sum of the center frequency of the second frequency band and a center frequency of the fifth frequency band.

8. The base station of claim 1, in case that RF chain including the BB processor, the IF band processing, and the RF band processor are plurality, wherein the switch matrix control signal maps the at least one PLL to the antenna array.

9. The base station of claim 1, wherein the switch matrix control signal is determined by a predetermined scheduling standard, and wherein the predetermined scheduling standard includes at least one of a ratio of number of terminals connected to a network of each communication service operator in an arbitrary slot, and data throughput required by each network of each communication service operator.

10. A method performed by a base station in a wireless communication system, the method comprising:

generating and outputting a signal of a first frequency band corresponding to a first frequency bandwidth, by a baseband (BB) processor of the base station;

converting and outputting the signal of the first frequency band output from the baseband processor into a signal of a second frequency band corresponding to a second frequency bandwidth, by an intermediate frequency (IF) band processor of the base station;

generating a switch matrix control signal for mapping one of at least one phase locked loop (PLL) to an antenna array, by a switch matrix controller of the base station;

converting the signal of the second frequency band into a signal of a third frequency band corresponding to a third frequency bandwidth using the at least one PLL and a switch matrix based on the switch matrix control signal; and mapping the signal of the third frequency band to the antenna array and transmitting the signal of the third frequency band, by a radio frequency (RF) band processor of the base station.

11. The method of claim 10, wherein each of the at least one PLL corresponds to a frequency band operated by different communication service operators.

12. The method of claim 10, wherein a size of the second frequency bandwidth is smaller than a size of the third frequency bandwidth.

13. The method of claim 10, wherein a size of the first frequency bandwidth is equal to the size of the second frequency bandwidth.

14. The method of claim 10, wherein the switch matrix control signal is determined by a predetermined scheduling standard, and wherein the predetermined scheduling standard includes at least one of a ratio of number of terminals connected to a network of each communication service operator in an arbitrary slot, and data throughput required by each network of each communication service operator.

15. The method of claim 10, further comprising:

generating, by a digital frontend (DFE), an information bit for each channel.

16. The method of claim 10, further comprising:

generating, by a numerically controlled oscillator (NCO), a digital signal of a fourth frequency band; and converting, by a converter, the signal of the first frequency band into a digital signal in the second frequency band using the digital signal of the fourth frequency band, and converting the digital signal in the second frequency band into an analog signal of the second frequency band, wherein a center frequency of the fourth frequency band is equal to a center frequency of the second frequency band.

* * * * *